United States Patent
Sarkisian et al.

(10) Patent No.: US 9,873,812 B2
(45) Date of Patent: Jan. 23, 2018

(54) INKJET INK SET

(71) Applicant: Hewlett-Packard Development Company, L.P., Houston, TX (US)

(72) Inventors: George Sarkisian, San Diego, CA (US); David Michael Ingle, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/907,442

(22) PCT Filed: Sep. 23, 2013

(86) PCT No.: PCT/US2013/061234
§ 371 (c)(1),
(2) Date: Jan. 25, 2016

(87) PCT Pub. No.: WO2015/041702
PCT Pub. Date: Mar. 26, 2015

(65) Prior Publication Data
US 2016/0185992 A1  Jun. 30, 2016

(51) Int. Cl.
| | | |
|---|---|---|
| C09D 11/54 | (2014.01) | |
| C09D 11/107 | (2014.01) | |
| C09D 11/38 | (2014.01) | |
| C09D 11/322 | (2014.01) | |
| C09D 11/40 | (2014.01) | |

(52) U.S. Cl.
CPC ............. *C09D 11/54* (2013.01); *C09D 11/38* (2013.01); *C09D 11/40* (2013.01)

(58) Field of Classification Search
CPC . C09D 11/38; C09D 11/54; C09D 5/00; B41J 11/0015; B41J 2/2114; B41M 5/0017
See application file for complete search history.

(56) References Cited

U.S. PATENT DOCUMENTS 4,302,367 A * 11/1981 Cordes .................. D21H 19/50
524/25
5,925,701 A * 7/1999 Kung ...................... C08L 67/02
524/410

(Continued)

FOREIGN PATENT DOCUMENTS

| CN | 103242703 | 8/2013 |
| CN | 105378003 | 3/2016 |

(Continued)

OTHER PUBLICATIONS

International Search Report and Written Opinion for International Application No. PCT/US2013/061234 dated Jun. 26, 2014, 12 pages.

(Continued)

*Primary Examiner* — Stephen Meier
*Assistant Examiner* — John P Zimmermann
(74) *Attorney, Agent, or Firm* — HP Inc. Patent Department (57) ABSTRACT

Examples provide inkjet ink sets and related methods. An ink set may include a pre-treatment fixing fluid, an ink, and a post-treatment fluid including a binder and a surfactant having a hydrophilic-lipophilic balance (HLB) value of greater than about 12.

16 Claims, 2 Drawing Sheets

(56) References Cited

U.S. PATENT DOCUMENTS

| | | | |
|---|---|---|---|
| 5,976,673 A * | 11/1999 | Aoki | D06P 1/6138 347/105 |
| 6,513,924 B1 * | 2/2003 | Goldberg | B41J 3/4078 347/102 |
| 8,147,602 B2 | 4/2012 | Lauw et al. | |
| 8,409,341 B2 | 4/2013 | Iftime et al. | |
| 2005/0137282 A1 | 6/2005 | Cagle et al. | |
| 2011/0217646 A1 | 9/2011 | Shirai et al. | |
| 2011/0300298 A1 | 12/2011 | Kamibayashi et al. | |
| 2011/0303113 A1 | 12/2011 | Sarkisian et al. | |
| 2012/0128949 A1 | 5/2012 | Goto | |
| 2012/0206533 A1 | 8/2012 | Ng et al. | |
| 2013/0029111 A1 | 1/2013 | Bhattacharyya et al. | |
| 2013/0076842 A1 | 3/2013 | Sarkisian et al. | |
| 2013/0201252 A1 * | 8/2013 | Namba | C09D 5/00 347/21 |
| 2016/0175261 A1 * | 6/2016 | Abbott | A61K 31/00 514/21.91 |

FOREIGN PATENT DOCUMENTS

| | | |
|---|---|---|
| EP | 2623330 A1 | 8/2013 |
| WO | WO2014070132 A1 | 5/2014 |
| WO | WO2015023274 A1 | 2/2015 |

OTHER PUBLICATIONS

Extended European Search Report for International Application No. PCT/US2013/061234 dated Aug. 19, 2016, 7 pages.

\* cited by examiner

INKJET INK SET

BACKGROUND

Inkjet printing is a popular way of recording images on various media surfaces, particularly paper and photo media substrates. Inkjet printers typically use an ink formula including a colorant and some combination of ingredients to achieve the desired print quality and/or printer performance. These printers commonly operate by dispensing the ink formula from a cartridge onto a surface of a print medium as the print medium is conveyed past a print head of an inkjet printer.

BRIEF DESCRIPTION OF THE DRAWINGS

The detailed description section references the drawings, wherein.

Certain examples are shown in the above-identified figures and described in detail below. The figures are not necessarily to scale, and various features and views of the figures may be shown exaggerated in scale or in schematic for clarity and/or conciseness.

DETAILED DESCRIPTION

As a preliminary matter, it is noted that in this description, various aspects of the illustrative implementations are described using terms commonly employed by those skilled in the art to convey the substance of their work to others skilled in the art. It will be apparent to those skilled in the art that alternate implementations may be practiced with only some of the described aspects. For purposes of explanation, specific numbers, materials, and configurations are set forth in order to provide a thorough understanding of the illustrative implementations. It will be apparent to one skilled in the art that alternate implementations may be practiced without the specific details. In other instances, well-known features may be omitted or simplified in order not to obscure the illustrative implementations.

It should also be noted that the phrases "in various implementations," "in some implementations," "in various examples," "in some examples," and the like, are used repeatedly. The phrases generally do not refer to the same implementations; however, they may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Furthermore, concentrations, amounts, and other numerical data may be presented in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of "about 1 wt % to about 20 wt %" should be interpreted to include not only the explicitly recited values of about 1 wt % to about 5 wt %, but also include individual values 2 wt %, 3 wt %, and 4 wt %, and sub-ranges such as 5 wt % to 15 wt %, 10 wt % to 20 wt %, etc.

In addition, the inkjet ink sets, post-treatment fluids, and related methods described herein may be described with particular examples from non-exhaustive lists. Any combinations of material in various amounts that perform the functions described herein, however, may be within the scope of the principles described herein, unless indicated otherwise.

To provide a backdrop for the present disclosure, it is noted that some inkjet printing inks have been known to include a mixture of durability resin and pigment in the same ink to achieve a certain level of print durability. The amount and type of durability resin in the ink may be limited in the presence of the pigment in the same fluid due to the printer cartridge design and its thermal effects. Printer cartridge reliability may sometimes be an issue when ink solvents are optimized for a specific durability resin as the ink design space may be limited, with water-fast prints difficult to achieve.

Other print methods may use a roll-coated pre-treatment fluid containing a combination of calcium salts and durability resin to prime media before ink colorants are jetted onto the media. Although this method may provide bleed and coalescence control and improve image durability on coated offset media, the pre-treatment fluid floods the entire surface of the media even when area of the print media to be printed may be very low (e.g., 15% or less). In addition, the roller equipment may be costly, whose cost may be justified only for mid- to large-scale printing systems. Furthermore, this application to glossy offset media may be less than desirable due to poor web rub durability and loss of print gloss.

It has been recognized that separating specific compositional elements into a multiple-cartridge ink set can provide improved printing performance characteristics including durability and optical density, over a wide variety of applications. It is noted that when discussing the present compositions and methods, each of these discussions can be considered applicable to each of these embodiments, whether or not they are explicitly discussed in the context of that implementation. Thus, for example, in discussing a post-treatment fluid used in an ink set, such a post-treatment fluid may also be used in a method of producing images, and vice versa.

Figure 1:
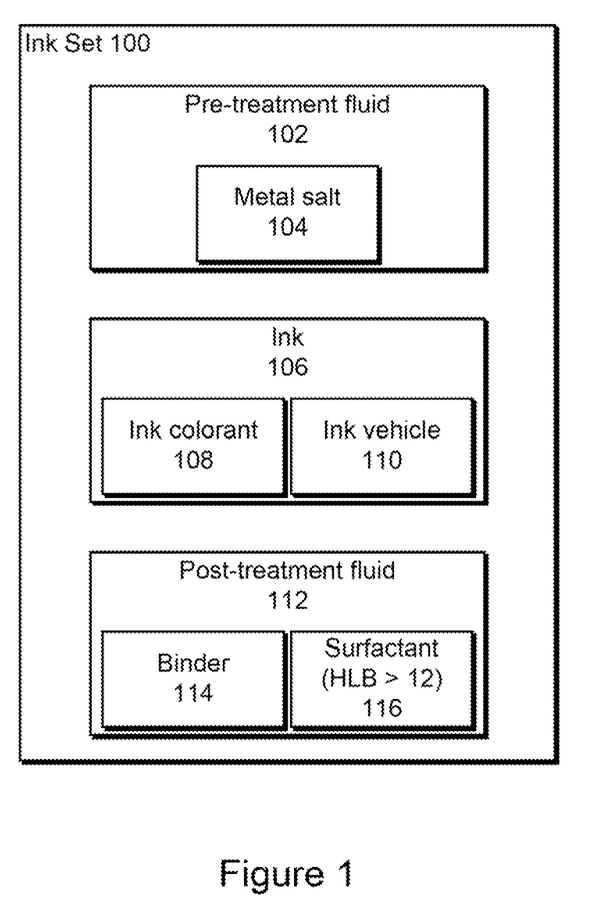
FIG. 1 is a block diagram of an example ink set.

With the above in mind, described herein are various implementations of ink sets including a pre-treatment fixing fluid, an ink, and a post-treatment fluid. An example ink set 100 is illustrated in FIG. 1. As illustrated, the pre-treatment fixing fluid 102 may include a metal salt 104, the ink 106 may include an ink colorant 108 and an ink vehicle 110, and the post-treatment fluid 112 may include a binder 114 and a surfactant 116 having a hydrophilic-lipophilic balance (HLB) value of greater than about 12. As the ink set 100 may be adapted for separate inkjetting onto a media, the pre-treatment fixing fluid 102 may be devoid of colorant and binder, the ink 106 may be devoid of metal salt and binder, and the post-treatment fluid 112 may be devoid of colorant and metal salt.

As used herein, the term "devoid of" when referring to a component (such as, e.g., a metal salt, a colorant, a binder, etc.) may refer to a composition that does not include any added amount of the component, but may contain residual amounts, such as in the form of impurities. For example, components such as, for example, metal salts may be inherently present in residual or trace amounts in water or other vehicle components, and those concentrations may be present, provided they do not unfavorably interact with colorant or other ingredients. The components may be present in trace amounts, and in one aspect, in an amount of less than 0.1 weight percent (wt %) based on the total wt % of the composition (e.g., pre-treatment fluid, ink, or post-treatment fluid), even though the composition is described as being "devoid of" the component. In other words, "devoid of" of a component may mean devoid of added component but allows for trace amounts or impurities inherently present in certain ingredients.

Turning now to the pre-treatment fixing fluid 102, this composition may include a metal salt 104. In various implementations, the metal salt 104 may control pigment migration. In various implementations, the metal salt 104 may include a polyvalent metal cation. In other implementations, the metal salt 104 may include a polyvalent metal cation selected from the group of $Ca^{2+}$, $Mg^{2+}$, or $Zn^{2+}$, and mixtures thereof. In one example, the polyvalent metal cation may be $Ca^{++}$. Additionally, such salts may include anions as well. Examples of anions include $Cl^-$, $I^-$, $Br^-$, $NO^{3-}$ or $RCOO^-$, where R is H or any hydrocarbon chain, e.g., from C1 to C8, branched or straight chained. The polyvalent metal salt component may be a divalent or a higher polyvalent metal cation and anion. In some examples, the polyvalent metal salt component may be soluble in water. Non-limiting examples of polyvalent metal cations include divalent metal cations, such as $Ca^{2+}$, $Cu^{2+}$, $Ni^{2+}$, $Mg^{2+}$, $Zn^{2+}$ and $Ba^{2+}$ or a combination thereof; trivalent metallic ions, such as $Al^{3+}$, $Fe^{3+}$ and $Cr^{3+}$ or a combination thereof. In one aspect, the polyvalent metal salt anion may be a chloride ($Cl^-$) or acetate ($CH_3COO^-$). In some examples, the polyvalent metal salt may be composed of divalent or polyvalent metallic ions and of nitrate or carboxylate ions. The carboxylate ions may be derived from a saturated aliphatic monocarboxylic acid having 1 to 6 carbon atoms or a carbocyclic monocarboxylic acid having 7 to 11 carbon atoms. Non-limiting examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid. In some examples, the polyvalent metal salt may be selected from a group consisting of calcium propionate, calcium chloride, calcium nitrate, magnesium nitrate, magnesium acetate or zinc acetate. In some other examples, the polyvalent metal salt may be calcium chloride or calcium nitrate ($CaCl_2$ or $Ca(NO_3)_2$). In yet some other examples, the polyvalent metal salt may be calcium chloride ($CaCl_2$). In yet some other examples, the polyvalent metal salt may be anhydrous.

The metal salt 104 may be included in the pre-treatment fixing fluid 102 at a concentration suitable for the particular implementation. In various implementations, the pre-treatment fluid 102 may include metal salt 104 present in the pre-treatment fixing fluid 102 in a range of about 3 weight percent to about 10 weight percent. In an example, the metal salt 104 may be a calcium propionate metal salt present in the pre-treatment fixing fluid 102 in a range of about 3 weight percent to about 10 weight percent. In another example, the metal salt 104 may be a calcium propionate metal salt present in the pre-treatment fixing fluid 102 in a range of about 6 weight percent to about 9 weight percent. In yet another example, the metal salt 104 may be a calcium chloride metal salt present in the pre-treatment fixing fluid 102 in a range of about 3 weight percent to about 6 weight percent. Various other implementations may be possible within the scope of the present disclosure.

Pre-treatment fixing fluids within the scope of the present disclosure may include a mixture of a variety of different agents. Such agents may include, but are limited to, solvents, buffers, surfactants, biocides, water, etc.

The pre-treatment fixing fluid 102 may include a solvent present in total in the pre-treatment fixing fluid 102 in a range from about 0.1 wt % to about 30 wt %, depending on the jetting architecture, though amounts outside of this range may also be used. Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In at least some implementations, the pre-treatment fixing fluid 102 may include a tetraethylene glycol solvent.

Consistent with this disclosure, various additives may be employed to enhance the properties of the pre-treatment fixing fluid 102 for specific applications. For example, non-ionic, cationic, and/or anionic surfactants may be present in total in the ink in a range from about 0.01 wt % to about 10 wt %. In at least some implementations, the pre-treatment fixing fluid 102 may include SURFYNOL® SE-F surfactant (Air Products and Chemicals, Inc.). Other example additives may include, but are not limited to, water, buffers, antimicrobial agents, viscosity modifiers, materials for pH adjustment, sequestering agents, preservatives, and the like. In one example, the pre-treatment fixing fluid may be predominantly water. Buffers such as, for example, methanesulfonic acid, may be used to buffer the pH of the pre-treatment fixing fluid to a particular pH. In some examples, the buffer may buffer the pH of the pre-treatment fluid to a pH of about 6.0. Antimicrobial agents, such as biocides and fungicides, may be added to inhibit the growth of harmful microorganisms. Example antimicrobial agents may include, but are not limited to, the NUOSEPT® (Ashland Inc.), UCARCIDE™ (Dow Chemical Co.), and PROXEL® (Arch Chemicals) series, and combinations thereof.

With respect to the ink 106, in various implementations, the ink 106 may include an ink colorant 108 in an ink vehicle 110. In various implementations, the ink set 100 may include a plurality of inks, each with an ink colorant and ink vehicle, and devoid of metal salt. Generally, any colorant may be used in the present inks. The colorant 108 may be a pigment, and in at least some of these implementations, the colorant 108 may comprise a dispersant-stabilized pigment. In other implementations, the colorant 108 may be a dye or a dye/pigment mix. As used herein, "dye" may refer to compounds or molecules that impart color to the ink 106. As such, dye may include molecules and compounds that absorb electromagnetic radiation or certain wavelengths thereof. For example, dyes may include those that fluoresce and those that absorb certain wavelengths of visible light. Generally, dyes may be water soluble. Furthermore, as used herein, "pigment" may generally include pigment colorants, magnetic particles, aluminas, silicas, and/or other ceramics, organo-metallics, metallic particulates, or other opaque particles.

Various implementations of inks 106 including a pigment colorant may also include a pigment dispersant. In various implementations, the dispersant may be a styrene-acrylate-type dispersant such as, but not limited to, acrylic polymers having hydrophilic monomers including acid monomers, and hydrophobic monomers. In some examples, the ink 106 may include styrene-acrylate-type dispersant present in the ink 106 in amount of about 0.1 wt % to about 5 wt %. Hydrophobic monomers that can be polymerized in the acrylic dispersant may include, but are not limited to, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Acidic monomers may be present in the acrylic dispersant at from about 0.1 wt % to about 30 wt %. Acidic monomers that may be used in the acrylic dispersant may include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Additionally, the acrylic dispersants may include reactive surfactants such as functionalized ethylene glycol acrylates (such as, e.g., the SIPOMER® surfactant series from Rhodia). Other non-limiting examples of reactive surfactants may include HITENOL™ (polyoxyethylene alkylphenyl ether ammonium sulfate) and NOIGEN™ (polyoxyethylene alkylphenyl ether) reactive surfactants from Dai-Ichi Kogyo Seiyaku Co., Ltd.; TREM® (sulfosuccinates) from Henkel; and the MAXEMUL® (anionic phosphate ester) reactive surfactants from Uniqema. Suitable grades of some of the materials listed above may include HITENOL™ BC-20, NOIGEN™ RN-30, TREM® LT-40, and MAXEMUL® 6106 and 6112.

As used herein, "liquid vehicle" or "ink vehicle" may refer to the liquid fluid in which colorant 108 is placed to form an ink. A wide variety of ink vehicles 110 may be used with the ink sets 100 and methods of the present disclosure. Such ink vehicles 110 may include a mixture of a variety of different agents. Such agents may include, but are limited to, solvents, surfactants, biocides, water, etc.

The ink vehicle 110 may include a solvent present in total in the ink 106 in a range from about 0.1 wt % to about 30 wt %, depending on the jetting architecture, though amounts outside of this range may also be used. Classes of co-solvents that can be used can include organic co-solvents including aliphatic alcohols, aromatic alcohols, diols, glycol ethers, polyglycol ethers, 2-pyrrolidinones, caprolactams, formamides, acetamides, glycols, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle 110 may include a 2-hydroxyethyl-2-pyrrolidone solvent.

Consistent with this disclosure, various additives may be employed to enhance the properties of the ink 106 for specific applications. For example, non-ionic, cationic, and/or anionic surfactants may be present in total in the ink 106 in a range from about 0.01 wt % to about 10 wt %. In at least some implementations, the ink vehicle 110 may include a silicone-free alkoxylated alcohol surfactant such as, for example, TEGO® Wet 510 (Evonik Tego Chemie GmbH). Other example additives may include, but are not limited to, water, antimicrobial agents, viscosity modifiers, materials for pH adjustment, sequestering agents, preservatives, and the like. In one example, the ink vehicle 110 may be predominantly water. Antimicrobial agents, such as biocides and fungicides, may be added to inhibit the growth of harmful microorganisms. Example antimicrobial agents may include, but are not limited to, the NUOSEPT® (Ashland Inc.), UCARCIDE® (Dow Chemical Co.), and PROXEL® (Arch Chemicals) series, and combinations thereof.

Turning now to the post-treatment fluid 112, in various implementations, the post-treatment fluid 112 may include a binder 114. The binder 114 may be present in the post-treatment fluid 112 at a content higher than comparative inkjet inks. For example, the binder 114 may be present in the post-treatment fluid 112 of at least 10 weight percent. In some implementations, the binder 114 may be present in the post-treatment fluid 112 in a range of about 12 weight percent to about 30 weight percent. In other implementations, the binder 114 may be present in the post-treatment fluid 112 in a range of about 20 weight percent to about 30 weight percent. Due at least in part to separating specific compositional elements into a multiple-cartridge ink set, potential interaction between binder and colorant within a print cartridge can be avoided. For example, for comparative inkjet inks, print reliability may be impacted by nozzle clogging, and nozzle wiping to inhibit clogging tends to impact print speed and/or throughput. With the inkjet ink sets of the present disclosure, nozzle clogging may be decreased, allowing for nozzle wiping frequency to be also be decreased.

In various implementations, the binder 114 may be a latex. As used herein, "latex" or "latex resin" may refer to discrete polymer particles dispersed in the post-treatment fluid. In one example, the latex may be selected from a group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, and mixtures thereof. In another example, the latex in the post-treatment fluid may be an acrylic latex.

In some other examples, the latex resin may be a latex containing particles of a vinyl acetate-based polymer, an acrylic polymer, a styrene polymer, an SBR-based polymer, a polyester-based polymer, a vinyl chloride-based polymer, or the like. In yet some other examples, the latex resin may be a polymer or a copolymer selected from a group consisting of acrylic polymers, and vinyl-acrylic copolymers. The latex resin may have a weight average molecular weight ($M_w$) of about 5,000 to about 500,000. The latex resin may have a weight average molecular weight ($M_w$) ranging from about 100,000 to about 500,000, without limitation. In some other examples, the latex resin may have a weight average molecular weight of about 150,000 to 300,000.

The average particle diameter of latex resin particles may be from about 10 nm to about 1 μm. In some other examples, the average particle diameter may be from about 10 nm to about 500 nm. In yet other examples, the average particle diameter may be from about 50 nm to about 250 nm. In still further examples, the average particle diameter may be from about 160 nm to about 220 nm. The particle size distribution of the latex is not particularly limited, and either latex having a broad particle size distribution or latex having a mono-dispersed particle size distribution may be used. It may also possible to use two or more kinds of latex particles each having a mono-dispersed particle size distribution in combination.

The latex resin components may include, but are not limited to, latex resins sold under the name HYCAR® or VYCAR® (Lubrizol Advanced Materials Inc.); RHOPLEX® (Rohm & Hass Co.); NEOCAR® (Dow Chemical Co.); AQUACER® (BYK Inc.) or LUCIDENE® (Rohm & Haas Co.).

Although separating specific compositional elements into a multiple-cartridge ink set may be advantageous as compared to ink formulas including some combination of metal salts and durability resin, and sometimes ink, it has been recognized that it may be possible for the binder of the post-treatment fluid may react with residual metal salt of the pre-treatment fluid. In some cases, the reaction of the metal salt with the binder may result in flocculation, which may appear as a white gel. This flocculation may negatively impact the durability and print gloss, particularly on glossy media, and may sometimes be present even if the amount of binder is increased. For example, in some instances, a print gloss may be decreased by 10 to 20 units on 60 degree gloss on glossy offset media. In some cases, this flocculation may be observed for post-treatment fluids including a binder having a high acid number (e.g., acid number 10-100) and for post-treatment fluids including a binder having a low acid number (e.g., <10) dispersed in an anionic surfactant.

It has been recognized that a post-treatment fluid 112 including a high-hydrophilic-lipophilic balance (HLB) surfactant 116 may avoid the flocculation issue noted above. In some implementations, the high-HLB surfactant 116 may form a protective outer layer around the charged binder 114, which may mask the binder 114 from reacting with the metal salt 104 of the pre-treatment fluid 102. In at least some of these implementations, the final print film may have a higher gloss and durability, especially on glossy offset media, as compared to prints produced without separate pre-treatment fluid 102 with metal salt 104, ink 106, and post-treatment fluid 112 including a binder 114 and a high-HLB surfactant 116. As used herein, a high-HLB surfactant 116 may include, surfactants having an HLB value of greater than about 12. In some implementations, the high-HLB surfactant 116 may be a surfactant having an HLB value of about 16 or greater than about 16.

In various implementations, the surfactant 116 may comprise any high-HLB surfactant that is non-reactive to the metal salt(s) 104 of the pre-treatment fluid 102. In at least some implementations, the high-HLB surfactant 116 may comprise a surfactant selected from the UNITHOX™ ethoxylates line available from Baker Hughes Inc. (such as, e.g., UNITHOX™ 480 having an HLB value of 16, UNITHOX™ 490 having an HLB value of 18, etc.). Other high-HLB surfactants may be similarly suitable.

The high-HLB surfactant 116 may be present in the post-treatment fluid 112 in a range of about 0.1 weight percent to about 5.0 weight percent. In various ones of these implementations, the high-HLB surfactant 116 may be present in the post-treatment fluid 112 at about 1 weight percent. Various other implementations with other quantities of the high-HLB surfactant 116 may be possible within the scope of the present disclosure.

The post-treatment fluid 112 may include a solvent present in total in the post-treatment fixing fluid 112 in a range from about 0.1 wt % to about 30 wt %, depending on the jetting architecture, though amounts outside of this range may also be used. Classes of co-solvents that may be used can include organic co-solvents including aliphatic alcohols, aromatic alcohols, diols, glycol ethers, polyglycol ethers, 2-pyrrolidinones, caprolactams, formamides, acetamides, glycols, and long chain alcohols. Examples of such compounds include primary aliphatic alcohols, secondary aliphatic alcohols. 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink may include a 2-hydroxyethyl-2-pyrrolidone and di-(2-hydroxyethyl)-5,5-dimethylhydantoin (such as, e.g., DANTOCOL™ DHE, from Lonza Inc.) co-solvents.

The post-treatment fluid 112 may include a wax. In various implementations, the wax may help improve the printing performance of the ink set 100 at least with respect to durability. The wax may comprise any suitable wax including, for example, polyethylene wax (such as, e.g., LIQUILUBE™ 405, from Lubrizol Deutschland GmbH). In various implementations, the post-treatment fixing fluid 112 may include a wax present in total in the post-treatment fixing fluid 112 in a range from about 0.1 wt % to about 3.0 wt %, though amounts outside of this range may also be used. In some examples, the post-treatment fixing fluid 112 may include the wax present in total in the post-treatment fixing fluid in a range from about 0.5 wt % to about 2.5 wt %.

Other example additives may include, but are not limited to, water, antimicrobial agents, viscosity modifiers, and the like. In one example, the post-treatment fluid 112 may be predominantly water. Antimicrobial agents, such as biocides and fungicides, may be added to inhibit the growth of harmful microorganisms. Example antimicrobial agents may include, but are not limited to, NUOSEPT® series (Ashland Inc.), UCARCIDE™ (Dow Chemical Co.), and PROXEL® (Arch Chemicals), and combinations thereof.

In various implementations, the ink set 100 may be incorporated into various apparatuses or systems for inkjet printing, such as printers, and may be suitable for use on many types of substrates of recording media, including but not limited, plain paper, glossy media, porous media, non-porous media, offset media, cartons/packaging, etc. In some implementations, the ink set 100 may comprise a first inkjet ink cartridge containing the pre-treatment fixing fluid 102, at least one second inkjet ink cartridge containing the ink 106, and a third inkjet ink cartridge containing the post-treatment fluid 112. In various implementations, the ink set 100 may comprise at least one other ink cartridge containing another ink.

Figure 2:
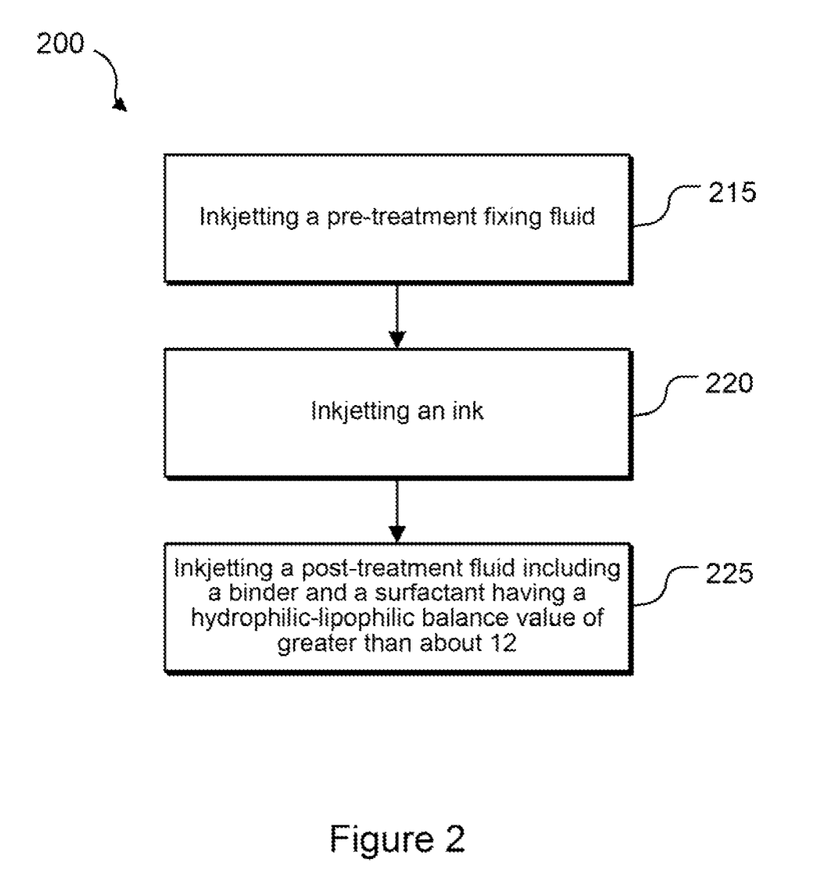
FIG. 2 is a flow diagram of an example printing method; all in which various examples may be implemented.

In addition to the ink sets described herein, the present disclosure provides for methods relating thereto, such as, for example, the method 200 illustrated in FIG. 2. Generally, the method of producing images on media may comprise separately inkjetting onto the media, in order, a pre-treatment fixing fluid at block 215, an ink at block 220, and a post-treatment fluid including a binder and a surfactant having a hydrophilic-lipophilic balance (HLB) value of greater than about 12 at block 225. In various implementations, the pre-treatment fixing fluid and post-treatment fluid are devoid of colorant, and the ink is devoid of metal salt and binder.

In various implementations, the post-treatment fluid may be inkjetted after the pre-treatment fixing fluid and the ink have dried. In some of these implementations, one or more drying operations may be performed after the pre-treatment fixing fluid and the ink have been inkjetted. The drying operation(s) may be performed at ambient temperature or under heat. For example, the drying operation may be performed at about 80° C., or in some examples, at about 100° C., or still further examples, at 80° C. and then at 100° C.

In other implementations, the post-treatment fluid may be inkjetted while the ink and the pre-treatment fixing fluid are still wet and have not completely dried. In some of these implementations, one or more drying operations may be performed after the pre-treatment fluid, the ink, and the post-treatment fluid have been inkjetted. The drying operation(s) may be performed at ambient temperature or under heat. For example, the drying operation may be performed at about 80° C., or in some examples, at about 100° C., or still further examples, at 80° C. and then at 100° C.

In various implementations, the pre-treatment fixing fluid may be inkjetted by a first inkjet ink cartridge, the ink may be inkjetted by a second inkjet ink cartridge, and the post-treatment fluid may be inkjetted by a third inkjet ink cartridge.

EXAMPLES

The following are illustrative examples of inkjet ink sets within the scope of the present disclosure. It is to be understood that experimental data provided does not limit the scope of the embodiments. Rather, the data merely illustrate the preparation of composition embodiments in accordance with the subject disclosure as well as for demonstrating the properties described above illustrating the usefulness of the inkjet ink sets.

Example 1

Pre-Treatment Fixing Fluid

A pre-treatment fixing fluid was prepared using the Compositional Components at the concentrations listed in TABLE 1.

TABLE 1

| Compositional Components | Pre-Treatment Fixing Fluid (wt %) |
|---|---|
| Calcium Propionate | 8.5 |
| SURFYNOL ® SE-F | 0.05 |

TABLE 1-continued

| Compositional Components | Pre-Treatment Fixing Fluid (wt %) |
|---|---|
| Tetraethylene Glycol | 12.0 |
| Methanesulfonic Acid | 0.38 |
| Biocide | 0.2 |
| Water | Balance |

Example 2

Post-Treatment Fluids

Post-treatment fluids (PTF) A and B were prepared using the Compositional Components at the concentrations listed in TABLE 2.

TABLE 2

| Compositional Components | PTF A (wt %) | PTF B (wt %) |
|---|---|---|
| Acrylic latex (acid number <10, dispersed with anionic sulfate surfactant) | 18 | 0 |
| Styrene-acrylic latex (acid number <10, dispersed with anionic sulfate surfactant) | 0 | 18 |
| DANTOCOL ™ DHE | 9 | 9 |
| UNITHOX ™ 480 surfactant (HLB value = 16) | 1 | 1 |
| LIQUILUBE ™ 405 wax | 1.50 | 1.50 |
| Biocide | 0.20 | 0.20 |
| Water | Balance | Balance |

Example 3

Post-Treatment Fluid Characterization 1

A comparative post-treatment fluid formula A ("Comparative Formula A") was formulated according to Compositional Components at the concentrations listed in TABLE 3.

PTF A from Example 2 and Comparative Formula A were each mixed with the pre-treatment fixing fluid from Example 1 at a 1:1 ratio and visually observed for flocculation, as shown in TABLE 3.

TABLE 3

| Compositional Components | PTF A (wt %) | Comparative Formula A (wt %) |
|---|---|---|
| Acrylic latex (acid number <10, dispersed with anionic sulfate surfactant) | 18 | 18 |
| Styrene-acrylic latex (acid number <10, dispersed with anionic sulfate surfactant) | 0 | 0 |
| DANTOCOL ™ DHE | 9 | 9 |
| UNITHOX ™ 480 surfactant (HLB value = 16) | 1 | 0 |
| LIQUILUBE ™ 405 wax | 1.50 | 1.50 |
| Biocide | 0.20 | 0.20 |
| Water | Balance | Balance |
| Result of mixing 1:1 with Pre-Treatment Fixing Fluid | OK - no reaction | Flocculation |

Example 4

Post-Treatment Fluid Characterization 2

A comparative post-treatment fluid formula B ("Comparative Formula B") was formulated according to Compositional Components at the concentrations listed in TABLE 4.

PTF B from Example 2 and Comparative Formula B were each mixed with the pre-treatment fixing fluid from Example 1 at a 1:1 ratio and visually observed for flocculation, as shown in TABLE 4.

TABLE 4

| Compositional Components | PTF B (wt %) | Comparative Formula B (wt %) |
|---|---|---|
| Acrylic latex (acid number <10, dispersed with anionic sulfate surfactant) | 0 | 0 |
| Styrene-acrylic latex (acid number <10, dispersed with anionic sulfate surfactant) | 18 | 18 |
| DANTOCOL ™ DHE | 9 | 9 |
| UNITHOX ™ 480 surfactant (HLB value = 16) | 1 | 0 |
| LIQUILUBE ™ 405 wax | 1.50 | 1.50 |
| Biocide | 0.20 | 0.20 |
| Water | Balance | Balance |
| Result of mixing 1:1 with Pre-Treatment Fixing Fluid | OK - no reaction | Flocculation |

Although certain implementations have been illustrated and described herein, it will be appreciated by those of ordinary skill in the art that a wide variety of alternate and/or equivalent implementations calculated to achieve the same purposes may be substituted for the implementations shown and described without departing from the scope of this disclosure. Those with skill in the art will readily appreciate that implementations may be implemented in a wide variety of ways. This application is intended to cover any adaptations or variations of the implementations discussed herein. It is manifestly intended, therefore, that implementations be limited only by the claims and the equivalents thereof.

What is claimed is:

1. An ink set, comprising:
a first inkjet ink cartridge containing a pre-treatment fixing fluid including a metal salt;
at least one second inkjet ink cartridge containing an ink including an ink colorant and an ink vehicle; and
a third inkjet ink cartridge containing a post-treatment fluid including a binder and a surfactant having a hydrophilic-lipophilic balance (HLB) value of greater than about 12, wherein the binder is selected from the group consisting of acrylic polymers or copolymers, vinyl acetate polymers or copolymers, polyester polymers or copolymers, vinylidene chloride polymers or copolymers, butadiene polymers or copolymers, styrene-butadiene copolymers, acrylonitrile-butadiene copolymers, and mixtures thereof and present in the post-treatment fluid in a range of about 6 weight percent to about 30 weight percent, and wherein the post-treatment fluid is devoid of any metal salt;
wherein the ink set is adapted for separate inkjetting of the pre-treatment fixing fluid, the ink, and the post-treatment fluid onto a medium.

2. The ink set of claim 1, wherein the HLB value is about 16.

3. The ink set of claim 1, wherein the surfactant is non-reactive to the metal salt.

4. The ink set of claim 1, wherein surfactant is present in the post-printing treatment fluid in a range of about 0.1 weight percent to about 5.0 weight percent.

5. The ink set of claim 1, wherein the binder is a latex and is present in the post-treatment fluid in a range of 20 weight percent to about 30 weight percent.

6. The ink set of claim 1, wherein the ink colorant is a pigment, and the metal salt includes a polyvalent metal cation selected from a group consisting of $Ca_{2+}$, $Mg_{2+}$, or $Zn_{2+}$, and mixtures thereof.

7. A post-treatment fluid for inkjet printing, comprising:
a binder selected from the group consisting of acrylic polymers or copolymers, vinyl acetate polymers or copolymers, polyester polymers or copolymers, vinylidene chloride polymers or copolymers, butadiene polymers or copolymers, styrene-butadiene copolymers, acrylonitrile-butadiene copolymers, and mixtures thereof, and present in the post-treatment fluid in a range of about 6 weight percent to about 30 weight percent; and
a surfactant having a hydrophilic-lipophilic balance (HLB) value of greater than about 12;
wherein the post-treatment fluid is devoid of a metal salt and is adapted for separate inkjetting.

8. The post-treatment fluid of claim 7, wherein the surfactant is present in the post-treatment fluid in a range of about 0.1 weight percent to about 5.0 weight percent.

9. A method of producing images on media, comprising:
separately inkjetting onto the media, in order, a pre-treatment fixing fluid, an ink, and a post-treatment fluid including a binder and a surfactant having a hydrophilic-lipophilic balance (HLB) value of greater than about 12, wherein the binder is selected from the group consisting of acrylic polymers or copolymers, vinyl acetate polymers or copolymers, polyester polymers or copolymers, vinylidene chloride polymers or copolymers, butadiene polymers or copolymers, styrene-butadiene copolymers, acrylonitrile-butadiene copolymers, and mixtures thereof and present in the post-treatment fluid in a range of about 6 weight percent to about 30 weight percent, and wherein the post-treatment fluid is devoid of a metal salt.

10. The method of claim 9, wherein said inkjetting the post-treatment fluid comprises inkjetting the post-treatment fluid after the pre-treatment fixing fluid and the ink dry.

11. The method of claim 9, wherein said inkjetting the post-treatment fluid is performed before the ink and the pre-treatment fixing fluid substantially dry.

12. The method of claim 9, wherein said inkjetting the pre-treatment fixing fluid comprises inkjetting the pre-treatment fixing fluid by a first inkjet ink cartridge, wherein said inkjetting the ink comprises inkjetting the ink by a second inkjet ink cartridge, and wherein said inkjetting the post-treatment fluid comprises inkjetting the post-treatment by a third inkjet ink cartridge.

13. The ink set of claim 1 wherein the surfactant is an ethoxylate.

14. The post-treatment fluid of claim 7 wherein the surfactant is an ethoxylate.

15. The method of claim 9 wherein the surfactant is an ethoxylate.

16. The post-treatment fluid of claim 7 wherein the binder is selected from the group consisting of acrylic polymers or copolymers, vinyl acetate polymers or copolymers, vinylidene chloride polymers or copolymers, butadiene polymers or copolymers, styrene-butadiene copolymers, acrylonitrile-butadiene copolymers, and mixtures thereof.

* * * * *

UNITED STATES PATENT AND TRADEMARK OFFICE
CERTIFICATE OF CORRECTION

PATENT NO. : 9,873,812 B2
APPLICATION NO. : 14/907442
DATED : January 23, 2018
INVENTOR(S) : George Sarkisian et al.

Page 1 of 1

It is certified that error appears in the above-identified patent and that said Letters Patent is hereby corrected as shown below:

On the Title Page

Column 2, under foreign patent documents, insert -- CN 102732100 10/2012 Xerox Corporation --.

In the Claims

In Column 12, Lines 11-12, in Claim 6, delete "$Ca_{2+}$, $Mg_{2+}$, or $Zn_{2+}$," and insert -- $Ca^{2+}$, $Mg^{2+}$, or $Zn^{2+}$, --, therefor.

Signed and Sealed this
Twenty-third Day of October, 2018

Andrei Iancu
*Director of the United States Patent and Trademark Office*